Dec. 17, 1968   W. F. LIST ET AL   3,417,397
SIGNAL DETECTION INTEGRATION AND LEVEL SENSING SYSTEM
USING THERMAL EFFECT DEVICES
Filed April 21, 1967   3 Sheets-Sheet 1
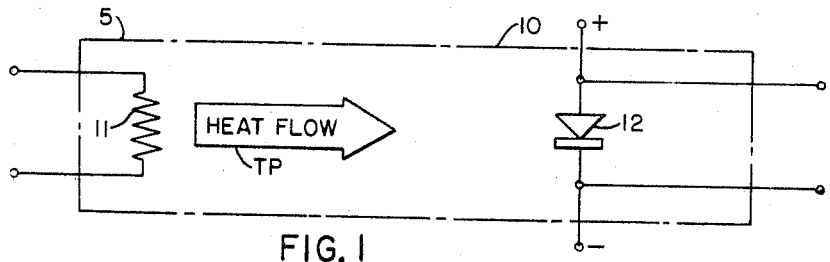
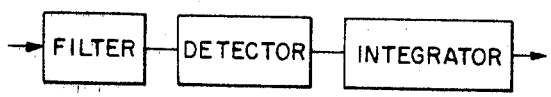
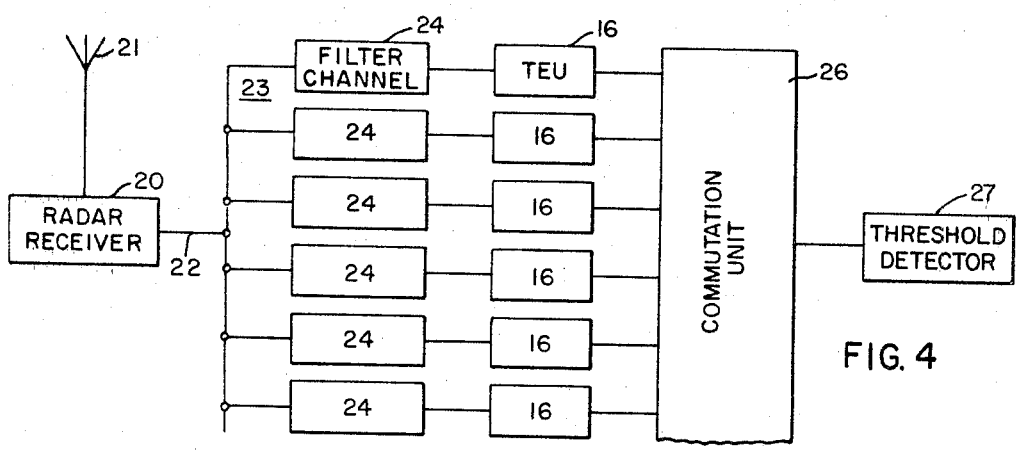
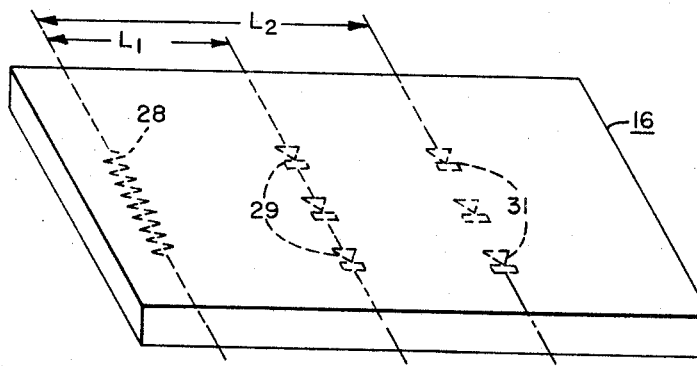
WITNESSES
Helen M. Farkas
James F. Young
INVENTORS
William F. List,
Jerry D. Donaldson, &
Alan J. Demco
BY John L. Wiegreffe
ATTORNEY

United States Patent Office 3,417,397
Patented Dec. 17, 1968

3,417,397
SIGNAL DETECTION INTEGRATION AND LEVEL SENSING SYSTEM USING THERMAL EFFECT DEVICES
William F. List, Linthicum, Md., Alan J. Demco, Portage, Pa., and Jerry D. Donaldson, Glen Burnie, Md., assignors to Westinghouse Electric Corporation, Pittsburgh, Pa., a corporation of Pennsylvania
Filed Apr. 21, 1967, Ser. No. 632,785
6 Claims. (Cl. 343—8)

ABSTRACT OF THE DISCLOSURE

Signal retrieval system for detecting a coherent signal immersed in a wide band spectrum including random noise quantizes the spectrum by contiguous filter channels, each of which includes a thermal electrical unit which utilizes both the thermal and electronic properties of semiconductor material to perform a circuit function of signal detection, integration and automatic threshold level control, usually performed by a combination of electrical components. Two main embodiments are illustrated, one providing a threshold reference voltage based on an amplitude comparison and the other utilizing an automatic threshold reference based on spectral density in the echo spectrum.

---

In U.S. Patent 3,181,149, issued Apr. 27, 1965, in the name of Norman L. Weinberg and Ralph J. Metz, for Signal Extraction Circuit and Method Employing Magnetic and Other Solid State Devices, owned by the assignee of this application and in copending patent application Ser. No. 360,050, filed Apr. 14, 1964, now Patent No. 3,345,572 in the name of Irving I. Kaplan and Joseph G. Fay, for Signal Translation System, also owned by the assignee of this application, there is described and claimed a signal data retrieval system in which the present invention could be utilized. Also, in another copending application S.N. 563,830, filed July 8, 1966, in the name of Roger R. J. McGee and Ralph J. Metz for Signal Translation System, there is also described and claimed a system similar to that of the previously mentioned applications.

This invention relates to a signal translation system and more particularly to improvements in a signal translation system for retrieving information signal data dispersed in a wide spectrum of signal frequencies, including noise and other frequencies of random phase and amplitude.

The invention is more particularly directed to a signal detection, integration and threshold level sensing system using thermal effect devices for retrieving the signal information from the different sections of the signal spectrum.

Although the invention is illustrated in connection with a system for retrieving pulse Doppler radar signal data from the Doppler echo power spectrum of a radar receiver, the invention is not so limited. Its adaptability to other signal translation systems will be apparent to those skilled in the art.

In coherent radar systems, utilizing the Doppler shift phenomena the shift in frequency of the received signal is proportional to the radial velocity between the transmitting source and the target and if suitably measurable will become a source of information about a particular target parameter, such as range rate, which is the radial velocity between the radar and the target. Since this portion of the signal intelligence resides in the frequency component of the signal and not in its amplitude it is conventional to quantize the power spectrum of the radio signals along radial and angular coordinates. The angular quantization is a function of the antenna, while the quantization of radial coordinates must take place within the confines of an individual angular quanta.

Detection of signals in a power spectrum, including random noise, such as is introduced by all practical antennas and receivers, is materially aided by reducing the bandwidths of the channels through which the received signal passes before a detection decision is made. Although the Doppler echo return signals constitute a continuum of random frequencies the center echo frequency is measurable to a satisfactory degree of resolution by using a large number of contiguous narrow bandwidth filters constituting fixed band channels covering the range of the Doppler frequency shift information which is of significance. The continuum of values of frequency may be quantized in the gain-bandwidth direction by the filter channels and, as will be seen later, quantized in the power direction by a thermal electrical unit, hereinafter referred to as a TEU unit, that replaces certain conventional electrical components. This frequency channelizing coincides with the bandwidth reduction made necessary or desirable, by the requirements of signal detection. Accordingly, pulse Doppler radar apparatus frequently employs a receiver system which is a multichannel system in which the Doppler frequency resolution is carried out by a bank of contiguous frequency filters. The output of the individual frequency filters is then examined by means of some high speed method of sequential interrogation. The frequency components throughout the signal spectrum are then averaged to provide the center frequency.

In the systems described in said copending patent applications, as well as in the present one, the received power frequency spectrum is separated into discrete segments by means of narrow bandpass filters having bandwidths commensurate with the range rate resolution desired. These bandpass filters are in channels which have electrical components for performing the function of frequency quantization, predetection filtering, detection and post-detection integration. The quantized portion of the Doppler frequency spectrum is filtered, demodulated and integrated in each channel. After a suitable integration time, the integrated information signal voltage in each channel is sampled, and the amplitude of this voltage is used to make a Yes-No decision. The integrated signal power plus the noise power in each channel is compared with a reference voltage for making the target detection decision.

Some of these prior systems utilize a fixed threshold reference voltage and as a result false detection signals are sometimes produced because the total signal power, including noise, in the individual channels varies up and down as a function of time and therefore a noise signal which normally might not be interpreted as a target signal may cause a false signal to be generated. In other similar systems, some means other than a fixed threshold reference signal is employed to provide an equal false alarm probability for all filters. These may conventionally take the form of a variable threshold reference voltage controlled in accordance with the total Doppler signal power, with the total Doppler spectrum being divided in the usual manner into a number of bands by contiguous channels in each of which the threshold is adjusted by suitable AGC action, or some similar technique. In these systems, it is assumed that there is uniform spectral distribution of noise power across the overall spectrum or that there is uniform noise density across each sub-band in the two approaches, respectively. The principal short-coming of these techniques is the dependence on uniform noise power density across the band and uniform response of all filters, detectors and integrators involved in the signal detection process. In theory, separate automatic adjusting mechanism for each filter in the bank would eliminate this problem but the mechanization is impractical when using conventional components or even integrated semiconductor circuit components relying solely on electronic characteristics of the components because of the complexity and cost of the circuitry involved.

The present invention is directed to a system of the general type as those mentioned for retrieving signal data from a wide power spectrum, in which a false alarm feature is inherently built into the processing portion of the system by the use of the TEU units. The present system utilizes both the thermal and electronic properties of semiconductor material of which the TEU unit is made, to perform a circuit function as distinguished from a simple combination of electrical components fabricated in a semiconductor substrate.

The molecularized TEU unit of the present invention utilizes both the thermal and electrical properties of semiconductor material to provide signal detection, signal integration and automatic output signal level adjustment as a function of average signal power per channel in a system, of the general type mentioned, in order to provide a close approximation to constant false alarm detection operation, hereinafter referred to as CFAR. The invention resides, not in the semiconductor TEU unit but in the special application of TEU units in a system for retrieving signals from a wide spectrum, including noise.

Although thermal electric units are fairly new their basic characteristics are known in the art and have been described in various publications, such as (a) the report of the IEEE Solid-State Device Research Conference, Michigan State University, June 1963; (b) in an article by R. A. Meadows and W. T. Matzen, entitled "Low Frequency Functional Electronic Blocks Using Thermal Propagation"; (c) in Electronics, vol. 37, No. 21, pp. 54 to 57, July 27, 1964 in an article by the same authors entitled Low Frequency Integrated Circuits Achieved With Thermal Transfer; and (d) in another article in the proceedings IEEE, vol. 52, No. 12, pp. 1496 to 1501, December 1964, in an article by W. T. Matzen, R. A. Meadows, J. D. Merryman and S. P. Emmons, entitled, Thermal Techniques as Applied to Functional Electronic Blocks. It may be helpful here to review the general characteristics of TEU units in order to facilitate an understanding of the objects of the present invention. Then a more complete understanding of the invetion will be apparent from the discussion in connection with the drawings.

The basic TEU unit 5, illustrated in FIG. 1 is a molecular block or body 10 of semiconductor material serving as a substrate, having a source of heat such as a heater 11 a thermal conducting path TP, and a temperature sensor 12. The heat source may be any element, active or passive, that is capable of dissipating power into the substrate. The thermal conduction path TP is provided by the body of the semiconductor substrate whose thermal characteristics can be altered by controlling the properties of the substrate. Both the electrical and the thermal conductivity properties of semiconductor material can be varied by doping the material. Also, certain of the electrical properties can be altered by applying an electrical potential in the region of the material under consideration. The temperature sensor 12 may be any temperature sensitive element with a known temperature coefficient, such as a diode, transistor, or the like. The typical thermal-electrical unit illustrated in FIG. 1 has a single sensor, but as will appear from subsequent description more than one sensor may be provided on each TEU unit to provide special operation.

There are four basic configurations for thermal electric units and each of these can be represented by an electrical transmission analog and expressions can be derived for the transfer, or gain function, relating the amplitude and the phase characteristics to the appropriate controlling parameters. By considering the heat transfer equation and applying a step input of heat an expression for the propagation delay time can be found. This time delay will be defined as the time required for the sensor to register a 10% output change and will be shown to be a function of the spacing between the heater and the sensor. Extending the electrical analog of the thermal unit, a thermal time constant can be defined as the product of the thermal resistance times the thermal capacitance. The time interval will be assumed to be the time required for the sensor to experience 63% of its total temperature change.

The four configurations which correspond to the four electrical analogies are briefly as follows:

(a) The unterminated bar corresponding to the unterminated transmission line has the heater adjacent one end and the sensor spaced from the heater toward the opposite end of the bar;

(b) The terminated bar which corresponds to the terminated transmission line has the heater at one end of the bar and a heat sink at the opposite end of the bar with the sensor in between;

(c) The terminated bar corresponding to a transmission line in which one end of the line is open circuited and the other end of the line is short-circuited with the input supplied intermediate the ends; in this configuration the sensor is at one end of the bar, the heat sink is at the opposite end of the bar and the heater is in between the two; and (d) The insulated bar which is the electrical analogy of a lossy transmission line; in this configuration the heaters are on one end of the bar, the sensors are on the opposite end of the bar and an insulator is provided between the body of the bar and the heat sink.

It is a primary object of the present invention to provide a signal retrieval system in which a thermal electrical unit is used to provide the detection, integration and threshold adjustment function in each of a plurality of contiguous channels.

Further objects will be apparent from the following description when taken in connection with the drawings, in which:

FIGURE 1 is the schematic representation of a thermal-electrical unit represented by its electrical equipment;

FIG. 2 is a schematic representation of a frequency detection channel of a Doppler radar system using conventional electronic components;

FIG. 3 is a schematic representation of a frequency detection channel of a Doppler radar system utilizing thermal-electrical units in accordance with the present invention;

FIG. 4 is a diagrammatic circuit diagram of a radar system comprising frequency detection channels utilizing thermal-electrical units in accordance with the present invention;

FIG. 5 is an isometric view of a thermal-electrical unit in accordance with one embodiment of the present invention;

Briefly, the present invention resides in the incorporation of thermal electric units into a system for retrieving signal data, such as Doppler radar information from a wide power spectrum echo return including noise. Such a retrieval system is, in effect, a spectrum analyzer in the form of contiguous filter bank channels as illustrated in FIG. 4 which quantize the power spectrum in the bandwidth direction. The TEU units integrate and quantize in the power direction, as a function of time, the signal energy in each channel. The time constants of the TEU units are analogous to resistance and capacitance parameters in electrical circuits.

Figure 10:
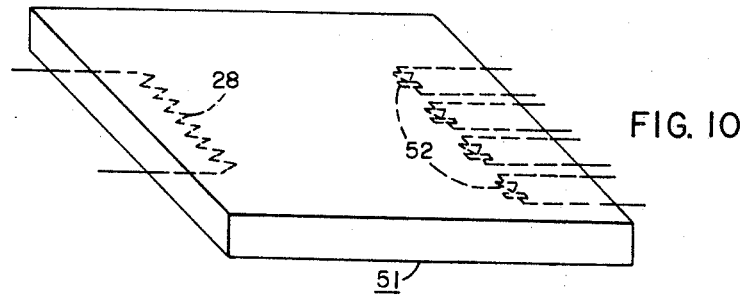
FIG. 10 is a TEU unit in accordance with a second embodiment of the invention.

Two primary embodiments of the invention are illustrated; one, utilizing the type of TEU unit illustrated in FIG. 5 which has one heater and two heat sensors, each with a different length thermal path; and a second version in which the TEU units have only a single heater with a plurality of sensors, each with the same length thermal path, as illustrated in FIG. 10. The first embodiment involves automatic comparison of signal amplitude with background noise performed by the dual time constants, while the second embodiment relies upon the spectral density comparison of signals in adjacent channels.

A few comments regarding the environmental background of the invention will be helpful. When detection is carried out automatically in a radar system all detection decisions are based upon the comparison of the output of the receiver with some threshold level. If the envelope of the receiver output exceeds a pre-established threshold, a signal is said to be present. It has previously been mentioned that heretofore various methods have been used for establishing this threshold, some relying entirely upon a fixed reference voltage while others attempt to provide a variable threshold which varies to some extent in response to the overall signal conditions.

The Doppler echo return to a radar receiver covers a wide spectrum since the antenna pattern has substantial width and the receiver output is a series of wavelets whose frequency varies slightly during their existence and therefore there is a more or less random phase between the wavelengths which also have varying amplitude. However, there is a greater coherency between the Doppler echo signals than between the random noise signals. Accordingly, for the purpose of improving the system detecting capability the output of the detector is integrated in a post detector integrator to provide a further improvement in the signal-to-noise ratio of the signal supplied to the detector circuit.

Conventionally, the detection and post-detector integration functions are performed in separate electrical circuits, each one corresponding to a channel of the filter bank such as that diagrammatically illustrated in FIG. 2. The equivalent gain in the signal-to-noise ratio obtained through this type of integration is expressed mathematically as $S/N = n^k$ where S is the signal amplitude, N is the noise amplitude, $n$ is the number of samples integrated and $k = 0.5$–$1.0$ (0.5 for low $S/N$ and 1.0 for high $S/N$). In the region of low $S/N$ this type of detection will improve the $S/N$ by approximately the square root of a number of samples integrated. The loss in the integration efficiency at low signal level results from the fact that some of the signal energy is converted to noise energy in the rectification process.

The response obtained by the combination of detector and integrator in the conventional network can be duplicated by the TEU unit while at the same time providing an inherently automatic threshold level control. In accordance with the present invention the TEU unit is incorporated into the channels of a radar signal retrieval system so that the channel illustrated in FIG. 2 takes the form illustrated in FIG. 3 by substituting the TEU unit of FIG. 5 or FIG. 10 for the detector integrator units of FIG. 2.

Figure 7:
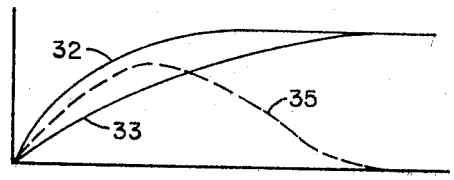
FIG. 7 is a graphical representation of the operation of the TEU unit of FIGS. 5 and 6.

In accordance with the present invention the output from each filter will be converted to heat in the heater and cause a change in the temperature of the TEU unit. This temperature change is then transmitted along the thermal path to the sensor, or sensors, as the case may be to generate signals, as hereinafter described. In general, the response of the individual sensor is such as that indicated in the solid lines of the graph of FIG. 7. As will be explained later, because of the inherent characteristics of the TEU units there is more than one way of obtaining an inherent automatic threshold level for making the detector decision.

Figure 8:
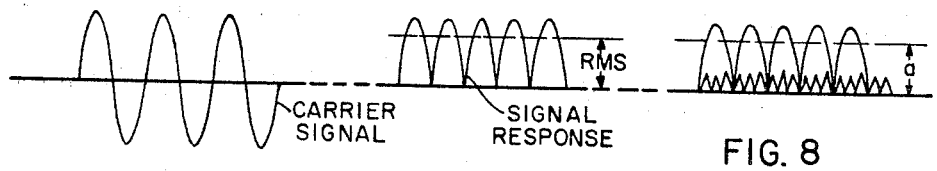
FIG. 8 is a graphical illustration of the frequency response of a TEU unit.

It has been found that for carrier frequencies of less than approximately 100 cycles per second the TEU unit will respond to the carrier envelope. As the carrier frequency increases above this value, the TEU unit becomes insensitive to frequency and responds to the RMS value of the carrier input. Fortunately, however, the TEU unit will also respond to the RMS value of the noise voltage so that no loss in the $S/N$ ratio results. This is illustrated in FIG. 8 where the difference between the RMS value of the carrier and the RMS value of the noise background is indicated at (a).

In a system in accordance with the present invention in which a TEU unit in the filter channel, combines the functions of detection and integration, such as shown in FIG. 3, no loss of signal is expected to occur because of rectification and therefore the value of K, in Equation 1 will remain constant. As a result the signal channel provides an output which is substantially a linear function of the signal input.

In order to make the advantages of the present invention more apparent it should be pointed out that in previous systems where a number of parallel channels are commutated into a single threshold detection circuit or into a series of parallel threshold circuits not having the present invention it has not been possible to have a substantially constant detection probability across the total band since in order to do this the channels must have matched performance if the input signal spectrum is broadband noise. This condition is very difficult to maintain with time and over normal temperature variations. Furthermore, it is substantially impossible to maintain the receiver output flat as a function of frequency due to factors such as bandpass filter ripple characteristics. Also thermal noise is only one contributor to the noise component of the receiver output. Furthermore, signals, clutter and jamming all of which do not have a flat frequency spectrum in a Doppler signal system also contributes to the noise component of the receiver output. All of these factors can be classified into two general categories: (a) degradation factors which vary relatively slowly with time as compared to the signal integration, such as receiver gain variations, spurious signals, and so forth; and (b) degradation factors which vary at rates comparable to the signal integration. In general, this latter category includes clutter due to the antenna main beam or major side lobe patterns.

One embodiment of the present invention provides a constant false alarm detection system wherein the threshold level is inherently and automatically adjusted in accordance with the characteristics of thermal electric units similar to that illustrated in FIG. 5 incorporated into a radar system illustrated in FIG. 4 and comprises a Doppler radar receiver 20 connected to a suitable antenna 21. The output of the receiver at 22 is terminated in a filter bank 23 comprising a plurality of parallel contiguous filter channels 24, the outputs of each of which drive a TEU unit 16. The outputs of units 16 are terminated in a commutation unit 26 which sequentially commutates the output signals from the TEU units 16 for each of the channels to a common threshold detection circuit 27.

Although any one of the four different types of TEU units mentioned previously may be used, the one chosen for illustrating the present invention is of the category (d) type illustrated in FIG. 5, where the heater is on one end of the semiconductor bar and the sensor, or sensors, are on the opposite end of the bar, with the body of the bar serving as the thermal path.

Figure 6:
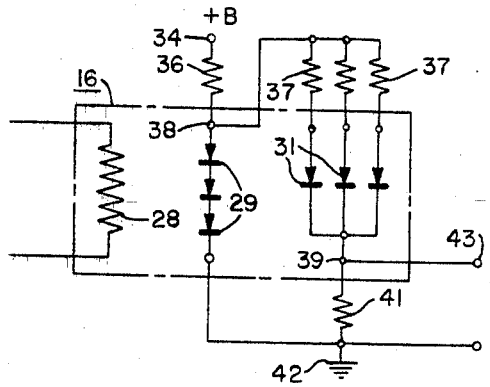
FIG. 6 is a circuit diagram of an electrical network into which the TEU unit of FIG. 5 may be connected to perform the combined function of detection, integration and threshold adjustment in a radar system illustrated in FIG. 4.

Referring to FIG. 6, the heaters 28 of the unit 16 are mounted at one end of the unit and the two sensors 29 and 31 are mounted at different distances L1 and L2, respectively, from the heater. The distance L1 between the heater and the sensor 29 provides a shorter integrating time constant, such as that indicated by the solid curve 32 of FIG. 7. Likewise, the distance L2 between the heater 28 and the sensor 31 provides a longer time constant, as indicated by the solid curve 33 in FIG. 7. These 5 different time constants can be obtained by using either the propagation time, that is, the time required for the heat to travel from the heater 28 to the different sensors 29 and 31 or by using the response time, that is, the time required for the sensors to go through 63% of their respective total changes. If the response time is used, the faster time constant, such as the voltage drop across the sensor 29, the output response will build up similar to curve 32 while the slower time constant due to the greater distance between the heater 28 and the sensor 31 will produce an output voltage drop variation with time corresponding to the curve 33. It will be apparent that, assuming that the sensors 29 and 31 have the same temperature characteristics, the output responses from the two sensors will reach the same final value for signals of long duration and will cancel. A short time signal representing a target will produce an output response represented by the curve 35.

In the system utilizing the TEU unit 16, the group of diodes 29 are fabricated into the semiconductor block in accordance with well known techniques. The diodes are also fabricated into the block with the appropriate diffusion techniques to produce an electrical circuit configuration as indicated in FIG. 6. From this it will be seen that the group of diodes 29 are electrically connected in a series circuit which also includes a resistor portion 36. Appropriate terminals are, of course, provided so that this circuit configuration can be appropriated into other circuit configurations. Also the group of diodes 31 have a common electrical connection for their cathodes and each of their anodes are connected to identical resistors 37 which are electrically connected to the junction point indicated at 38 between the resistor 36 and the upper one of the diodes 29. The appropriate terminals may be provided for connecting this much of the components of the TEU unit 16 into other circuit configuration, or alternatively, a further resistor 41 may be fabricated between the common terminal point 39 for the cathodes of the group of diodes 31 and some external ohmic contact terminal which may be connected to ground 42. It is to be understood that even though the group of diodes are connected in the circuit configuration as viewed in FIG. 6 they are physically located on the substrate such that all of the diodes 31 are on a line perpendicular to the thermal path from heater 28 so that the heat from the latter reaches the diodes 31 all at the same instant of time but at an instant of time later than that at which it reached the diodes 29.

In the operation of the embodiment just described, a suitable source of constant voltage represented by the terminal 34 is connected to the outer end of the resistor 36 and a suitable output terminal is connected to the point 39 which is the junction point between the diodes 31 and the resistor 41.

The resistor 36 has a value of resistance which is much, much greater than the total resistance of the forward biased diodes 29 so that the resistor 36 represents a substantially constant current source. The value of the resistors 37 is substantially the same as that of the forward biased diodes 31 and lower than the resistor 41, and serves the purpose of dividing the current approximately equally between each of the parallel diodes 31. Accordingly, in the operation of this embodiment, as signal energy is supplied to the heater 28 the heat will progress toward the right-hand side of the semiconductor block and first reach the diodes 29. For a better understanding of the present invention, a comment here regarding the nature of the forward biased characteristics of a silicon diode as a function of temperature will be helpful. The voltage drop across a silicon diode varies with temperature with coefficient of aproximately 26 millivolts per degree centigrade. The exact coefficient is a function of the level of current being carried, and if the diode is forward biased from a constant current source, then the diode may be considered to be a resistor with an effective value of resistance equal to the voltage across the diode terminal divided by the current through the diode.

Since the forward biased diodes have a negative temperature characteristic, that is, the voltage drop across the diodes decrease with an increase in temperature, the total value of the voltage across the diodes 29 in series is reduced by an increase in temperature causing the potential of the point 38 to decrease as the temperature is increased. This is what gives rise to the curve 32 in FIG. 7. Now, as the heat from the heater 28 continues to move to the right toward the group of diodes 31, the value of the curve 32 will reach a stable maximum point and as the diodes 31 begin to increase in temperature their voltage drop will decrease with a response such as shown in curve 33 of FIG. 7. Since the voltage across the load resistor 41 is essentially equal to the difference between the voltage across the diodes 29, and that across the diodes 31 and resistors 37, the voltage at the point 39 and the terminal 43 will increase as indicated by the dotted curve 35 of FIG. 7. The threshold detector thus measures the difference in output between the two integrators as represented by the dotted difference curve 35. Steady state signals in the receiver cancel while new signals, of something other than random pulses will be of sufficient length that there will be a short time interval during which the voltage is sufficient to yield an output pulse represented by the curve 35. The exact shape of the curve may be varied by changing the number of series diodes and/or shunt diodes.

Figure 9A:
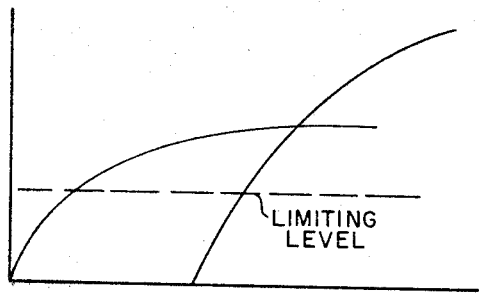
FIG. 9a and FIG. 9b are curves showing the output response signal of a system resulting from response time and propagation time characteristics of TEU's.
Figure 9B:
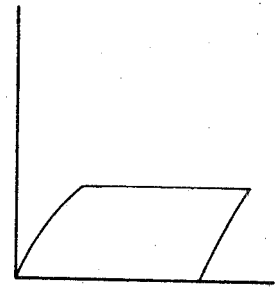

A similar response may be obtained by using both the response time and the propagation time in the semiconductor block. By using sensors, such as the diodes 29 and 31, having different gains and by locating the second group of sensors quite a distance from the first sensor a substantial time interval between the response curve with a response such as that illustrated in the graph of FIG. 9a can be obtained. Then by applying a suitable limiter to the two outputs at some selected value a sharp definite output pulse can be obtained as illustrated in FIG. 9b.

Figure 11:
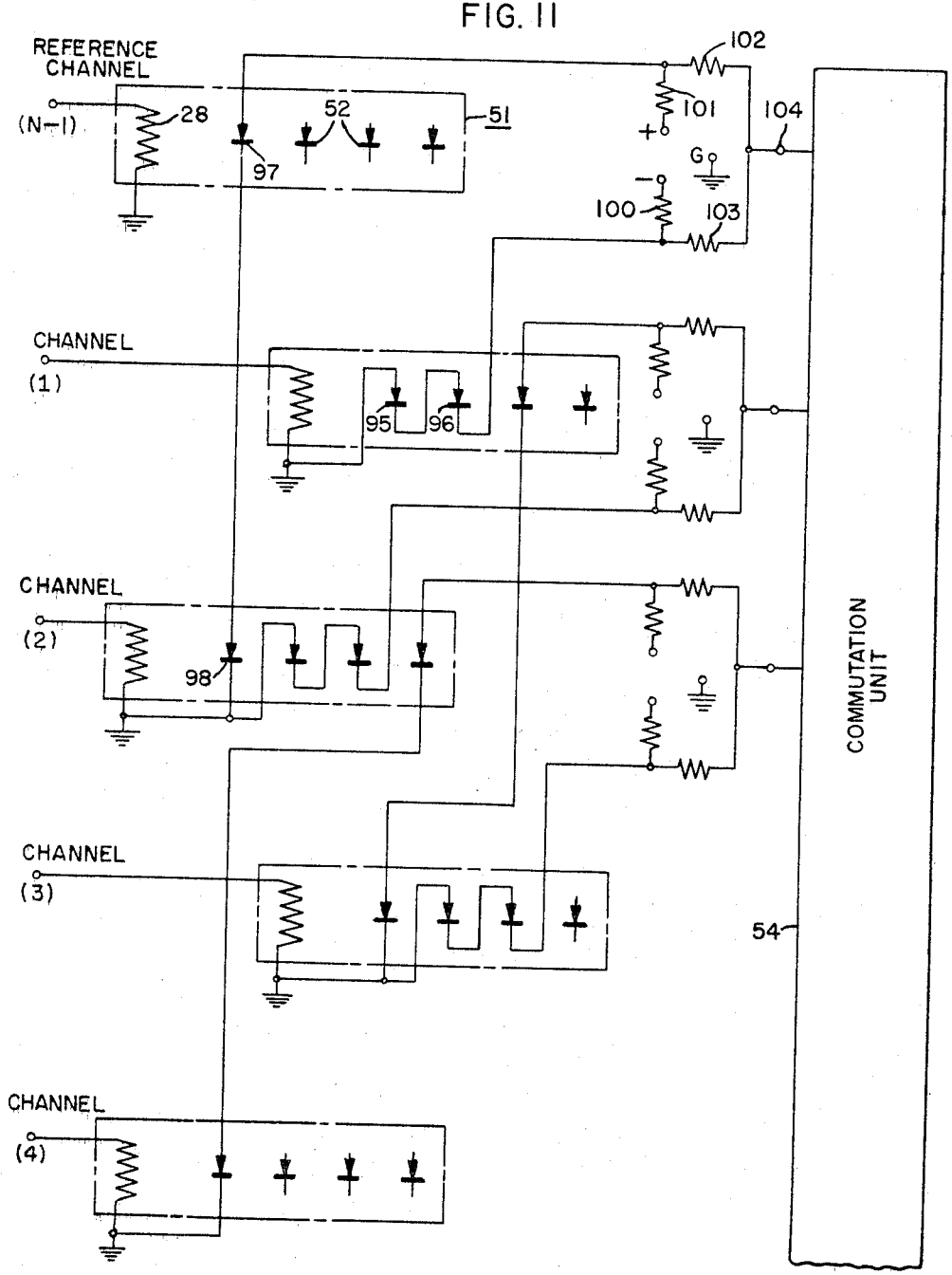
FIG. 11 is a partial circuit diagram of the second embodiment of the invention.

In the second embodiment of the present invention the target detection criteria for providing the constant false alarm technique with an automatic threshold reference is based on spectral density in the echo signal spectrum rather than on the amplitude of the return echo signals. The output of each channel is compared to the output of the adjacent channels and if the signal from one channel exceeds the weighted level in the adjacent channels a target detection is made. The second embodiment as illustrated in FIGS. 10 and 11, where FIG. 10 illustrates a second version of a TEU unit 51 which has the usual heater 28 and a single group of diodes 52 physically arranged in a semiconductor block each symmetrically disposed on a line parallel to the axis of the heater 28 and perpendicular to the thermal path so that all of the diodes have the same thermal time constant. The electrical configuration in which the diodes are connected in the system is shown in FIG. 11. In FIG. 11 the diodes 52 of the separate TEU units are of the type shown in FIG. 10 but are arranged on a horizontal line merely for the purpose of convenience, it being understood of course, that the spacing between the respective heaters of the TEU units and their corresponding diodes are all arranged at the same distance from the heater, thus modifying the exact response characteristic. The shaping of the curve can also be varied by changing the resistor networks.

Referring to FIG. 11 channel N–1 is indicated at the top and then in sequence channels 1, 2, 3 and 4 are spaced in sequence vertically of the sheet. In accordance with the general description above it is to be noted that one of the diodes of the TEU unit 52–N–1 is connected in series with one of the diodes of the TEU unit 52–2 which is adjacent on the opposite side of the channel in which the TEU unit 52-1 is connected, the channel No. 1 being the one that is assumed as being sampled. It is to be understood that each of the output circuits correspond to each of the filter channels and that these also are supplied to a suitable commutator means 54 so that the signal in each channel may be sampled and supplied to a utilization device not illustrated. As illustrated, there are both positive and negative sources of DC power supply which are used to forward bias the signal channel diodes 95 and 96 for channel No. 1 and the diodes 97 and 98 in the adjacent channels on either side of channel No. 1 which sample the signal power in the adjacent channels through resistors 100 and 101, respectively. It will be seen that in this configuration, in each output circuit there are four diodes connected in series, two of them being in a TEU unit for one channel and one each in the TEU units of each of the adjacent channels on either side, which might be considered as reference channels relative to any particular channel being sampled. This pattern is repeated throughout the system and therefore it is believed unnecessary to repeat the description of all the channels.

A potential divider of which the resistors 102 and 103 are representative of the voltage device for each channel, the value of the resistance 102 and 103 being identical and the output terminal being provided electrically intermediate these resistors are connected to the junction of the respective biasing resistors and sensing diodes. In all instances common ground G is the other terminal of the output for each channel. In all instances the source of power supply is connected so that the diodes are forward biased.

Proceeding further with the description, it is to be noted that two of the diodes 95, 96 of the TEU unit 52-1 for channel 1 are connected in series between ground G and a bias resistor 100. The two series diodes in the TEU unit 52-1 are poled oppositely to the reference diodes in the two adjacent channels so that at equal temperatures and bias currents they are electrically balanced against the diodes in the adjacent channels. Thus, equal positive and negative potentials exist across the output voltage divider 102 and 103 resulting in zero output voltage at the terminal 104. If a large amount of signal power is dissipated in the heater 28 in channel 1 than in the adjacent channels, the voltage balance will be upset and a positive output pulse will be obtained. If more signal power is dissipated in one of the reference channels, the output level will be negative, thus inhibiting a detection decision. If the signal power varies through each adjacent channel and has somewhat more power than that through the previous channel, the increased drop across one reference diode will be compensated for by the decreased drop in the other reference channel and the output will stay balanced. If a signal is injected in any one channel in such a case, a positive output pulse will be obtained. Thus, a uniform detection probability can be maintained across a bank of filters containing non-uniform amounts of clutter, as long as a predictable clutter pattern exists, as it does in fact in many cases since the clutter pattern shape is nearly dependent on the radar antenna pattern.

It is obvious that other circuit arrangements of sensing diodes and resistors can be employed to obtain either a broader reference channel or a special shaping. For example, if four reference diodes were in series, the signal power in the selected channel would have to be double the average noise power or the referencd signal to noise ratio could be 3 db for this example. Other values could also be achieved. Additionally, by using different bias currents, different temperature coefficients could be achieved and a different response characteristic obtained. Another modification could be to use different numbers of reference diodes in adjacent channels to compensate for non-ideal filter elements. Thus the N−2 and N+2 channels might each contain one reference diode, the N−1 and N+1 channel 2 diodes, and the signal channel four diodes, for a unity signal to noise ratio detector system, that is, any positive signal could be called a detection.

It is obvious that both of the two foregoing systems can be combined into a single system to yield both time variance and spectral density comparison in the same substrates. The specific advantages of these systems are (1) replacement of conventional detection, integration, and comparison circuits with monolithic drivers which utilize the bulk thermal properties of silicon substrates and highly reproducible sensing parameters to accomplish complex signal processing.

It will be obvious to those skilled in the art that many and numerous additional modifications, other than those illustrated could be made without departing from the present invention, which resides in the novel use of silicon diodes and their equivalents to perform the combination functions described. The use of the bulk properties of the semiconductor as outlined herein contributes greatly to the art in miniaturization, simplicity and reliability.

We claim as our invention:

1. Signal data retrieval apparatus for retrieving signal frequency data dispersed in a wide spectrum including noncoherent frequencies at random distribution and amplitude, said apparatus comprising; a plurality of signal channels each adapted to be connected to a source of a spectrum of frequencies including the desired signal power to be retrieved; said channels being substantially contiguous to embrace a desired band of frequencies having information-bearing significance, each of said channels having a selected bandwith, the center frequency of each channel determining the frequency of the signal power component of the channel, each of said channels icluding a thermal electrical unit utilized to perform electrical circuit functions of signal detection, integration and automatic threshold level control, each of said units comprising heater means connected to and energized by the output of one of said channels and thermal sensors responsive to the heat energy from said heater means to provide information-bearing signals.

2. Signal data retrieval apparatus as set forth in claim 1, and means for sequentially connecting the respective sensor outputs from each channel to utilization means.

3. The combination as set forth in claim 1 in which said thermal electrical units comprise a body of semiconductor material having a heater energized by the signal power output from one channel, a plurality of sensors, each mounted in said body, one of said sensors being closed to said heater than another of said sensors, means for applying a DC potential across said sensors and means for utilizing the potential difference developed across said sensors as a result of the thermal energy transferred to said sensors through said body.

4. The combination as set forth in claim 3 in which said sensors are forward biased diodes.

5. The combination as set forth in claim 1 in which said thermal electrical units comprise a body of semiconductor material, a heater in said body, a plurality of sensors in said body all having the same thermal time constant, the heater of one of said units being energized by the output of one of said channels, a sensor of said unit being connected in a series circuit including a source of direct current potential and sensors of thermal electrical units, the heaters of which are energized by the outputs of respective adjacent channels.

6. The combination as set forth in claim 1 in which said thermal electrical units comprise a monolithic body of semiconductor material having a heater element and a plurality of diodes all spaced from said heater element so as to have the same thermal time constant, means connecting at least one of said diodes in a series circuit including a forward biasing potential source and diodes of thermal electrical units of adjacent channels, all of the diodes being poled so that they are forward biased by said source, and resistor network means for deriving an output signal representing the difference in voltage drop between that developed across one of said sensors in one of said units and that developed across said sensors in said units in adjacent channels.

References Cited

UNITED STATES PATENTS

| 3,140,486 | 7/1964 | Gillmer | 343—8 |
| 3,149,333 | 9/1964 | Campbell | 343—8 X |
| 3,181,149 | 4/1965 | Weinberg et al. | 343—8 |

RODNEY D. BENNETT, *Primary Examiner.*

C. L. WHITHAM, *Assistant Examiner.*

U.S. Cl. X.R.

343—7.7